United States Patent
Sperle et al.

(10) Patent No.: US 8,108,320 B2
(45) Date of Patent: Jan. 31, 2012

(54) REQUIREMENT ANALYZING WITH DYNAMIC QUALIFICATION BLOCKS

(75) Inventors: Robin Sperle, Mannheim (DE); Heinz Schillinger, Sinsheim (DE); Mathias Schoenecker, Hambrucken (DE)

(73) Assignee: SAP AG, Walldorf (DE)

( * ) Notice: Subject to any disclaimer, the term of this patent is extended or adjusted under 35 U.S.C. 154(b) by 1142 days.

(21) Appl. No.: 11/283,668

(22) Filed: Nov. 21, 2005

(65) Prior Publication Data

US 2007/0118387 A1 May 24, 2007

(51) Int. Cl.
*G06Q 10/00* (2006.01)

(52) U.S. Cl. ......................... 705/321; 705/320

(58) Field of Classification Search .................. 705/320, 705/321
See application file for complete search history.

(56) References Cited

U.S. PATENT DOCUMENTS

| | | | |
|---|---|---|---|
| 6,029,195 A * | 2/2000 | Herz | 725/116 |
| 6,275,812 B1 | 8/2001 | Haq et al. | |
| 6,289,340 B1 * | 9/2001 | Puram et al. | 707/5 |
| 6,385,620 B1 | 5/2002 | Kurzius et al. | |
| 6,524,109 B1 | 2/2003 | Lacy et al. | |
| 6,618,723 B1 | 9/2003 | Smith | |
| 6,735,570 B1 * | 5/2004 | Lacy et al. | 705/7 |
| 7,054,821 B1 | 5/2006 | Rosenthal et al. | |
| 7,085,806 B1 | 8/2006 | Shapira | |
| 7,191,139 B2 * | 3/2007 | Roy et al. | 705/321 |
| 7,555,441 B2 | 6/2009 | Crow et al. | |
| 7,706,523 B2 * | 4/2010 | Agusta | 379/265.12 |
| 2002/0069080 A1 | 6/2002 | Roy et al. | |
| 2003/0009437 A1 | 1/2003 | Seiler et al. | |
| 2003/0078821 A1 * | 4/2003 | Gorur et al. | 705/7 |
| 2003/0083891 A1 | 5/2003 | Lang et al. | |
| 2003/0125970 A1 | 7/2003 | Mittal et al. | |
| 2003/0139953 A1 | 7/2003 | Guenther et al. | |
| 2004/0030566 A1 | 2/2004 | Brooks Rix | |
| 2005/0055226 A1 | 3/2005 | Dane et al. | |
| 2005/0149376 A1 | 7/2005 | Guyan et al. | |
| 2005/0267934 A1 | 12/2005 | Brown et al. | |
| 2006/0111932 A1 | 5/2006 | Brown et al. | |
| 2006/0178896 A1 | 8/2006 | Sproul | |
| 2006/0229896 A1 | 10/2006 | Rosen et al. | |
| 2007/0203772 A1 * | 8/2007 | Eun et al. | 705/8 |

OTHER PUBLICATIONS

U.S. Appl. No. 11/283,667, filed Nov. 21, 2005.
U.S. Appl. No. 11/284,263, filed Nov. 21, 2005.
"Webster's Third New international Dictionary of the English Language Unabridged", 1986, G. & C. Merriam Co., p. 1944).

* cited by examiner

*Primary Examiner* — Jami A Plucinski
*Assistant Examiner* — Amanda Kirlin
(74) *Attorney, Agent, or Firm* — Kenyon & Kenyon LLP (57) ABSTRACT

A method for matching an object with a set of qualifications to an object with a set of requirements includes determining whether one or more predetermined blocks of qualifications are wholly or partially fulfilled by the set of qualifications and matching the object with the set of qualifications to the object with the set of requirements based on the one or more predetermined blocks of qualifications that have been determined to be wholly or partially fulfilled.

18 Claims, 4 Drawing Sheets

REQUIREMENT ANALYZING WITH DYNAMIC QUALIFICATION BLOCKS

BACKGROUND

1. Technical Field

The present disclosure relates to requirement analyzing and, more specifically, to requirement analyzing with dynamic qualification blocks.

2. Description of the Related Art

Human Capital Management (HCM) systems are computerized solutions used by enterprises to effectively manage pools of human capital. HCMs are commonly integrated into a broader suit of Enterprise Resource Planning (ERP) applications that integrate information from a diverse set of applications into a singular database. One prime example of an ERP solution is "mySAP" or "SAP R/3" offered by SAP.

One function of HCM systems is to match human capital, such as employees, with positions so as to make the best possible use of available resources. ERP solutions have traditionally relied on rigid rules to keep key data well managed. As ERPs have evolved, methods have been devised to expand ERP flexibility and thereby enhance user friendliness and customization without compromising effectiveness. However, there is a continuing need to add flexibility while preserving and/or enhancing ERP effectiveness.

SUMMARY

A method for matching an object with a set of qualifications to an object with a set of requirements includes determining whether one or more predetermined blocks of qualifications are wholly or partially fulfilled by the set of qualifications and matching the object with the set of qualifications to the object with the set of requirements based on the one or more predetermined blocks of qualifications that have been determined to be wholly or partially fulfilled.

A method for matching a person represented by a person object within a database to a position represented by a position object within the database includes reading a set of qualifications applied to the person object from the database, looking up definitions for one or more qualifications blocks from a catalogue of qualifications blocks, determining which qualifications blocks are satisfied by the person object by comparing the set of qualifications applied to the person object to the definitions for the one or more qualifications blocks looked up in the catalogue of qualifications blocks, and matching the person to the position by comparing the qualifications blocks determined to be satisfied by the person object to properties associated with the position object.

A system for matching an object with a set of qualifications to an object with a set of requirements includes a determining unit for determining whether one or more predetermined blocks of qualifications are wholly or partially fulfilled by the set of qualifications and a matching unit for matching the object with the set of qualifications to the object with the set of requirements based on the one or more predetermined blocks of qualifications that have been determined to be wholly or partially fulfilled.

A system for matching a person represented by a person object within a database to a position represented by a position object within the database includes a reading unit for reading a set of qualifications applied to the person object from the database, a looking-up unit for looking up definitions for one or more qualifications blocks from a catalogue of qualifications blocks, a determining unit for determining which qualifications blocks are satisfied by the person object by comparing the set of qualifications applied to the person object to the definitions for the one or more qualifications blocks looked up in the catalogue of qualifications blocks, and a matching unit for matching the person to the position by comparing the qualifications blocks determined to be satisfied by the person object to properties associated with the position object.

A computer system includes a processor and a program storage device readable by the computer system, embodying a program of instructions executable by the processor to perform method steps for matching an object with a set of qualifications to an object with a set of requirements. The method includes determining whether one or more predetermined blocks of qualifications are wholly or partially fulfilled by the set of qualifications and matching the object with the set of qualifications to the object with the set of requirements based on the one or more predetermined blocks of qualifications that have been determined to be wholly or partially fulfilled.

A computer system includes a processor and a program storage device readable by the computer system, embodying a program of instructions executable by the processor to perform method steps for matching a person represented by a person object within a database to a position represented by a position object within the database. The method includes reading a set of qualifications applied to the person object from the database, looking up definitions for one or more qualifications blocks from a catalogue of qualifications blocks, determining which qualifications blocks are satisfied by the person object by comparing the set of qualifications applied to the person object to the definitions for the one or more qualifications blocks looked up in the catalogue of qualifications blocks, and matching the person to the position by comparing the qualifications blocks determined to be satisfied by the person object to properties associated with the position object.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

One important feature of the HCM is to match positions with human capital (people), such as employees. Human capital is described according to various qualifications and positions are described according to various requirements. Therefore, in matching human capital to positions, qualifications are compared against requirements.

Figure 1:
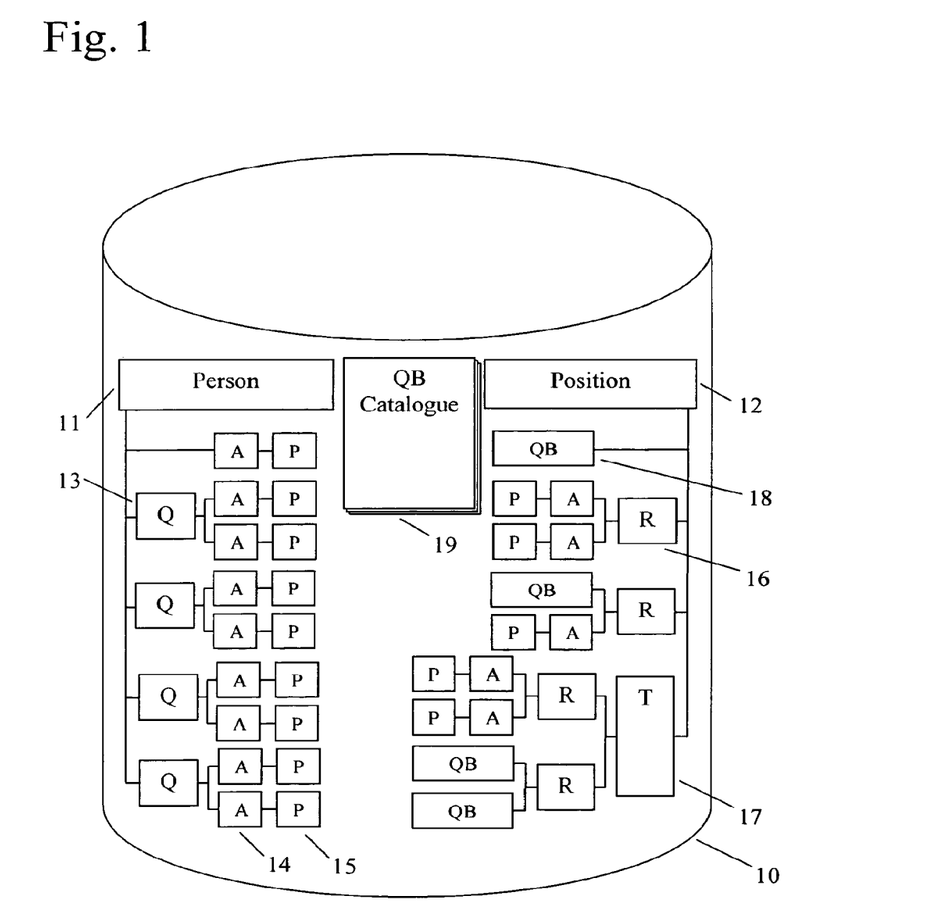
FIG. 1 shows a hierarchy diagram showing a database used to store information pertinent to both the human capital at the qualification side and the positions at the requirements side according to an embodiment of the present disclosure.

A database may be used to store information pertinent to both the human capital at the qualification side and the positions at the requirements side. FIG. 1 shows a hierarchy diagram showing a database used to store information pertinent to both the human capital at the qualification side and the positions at the requirements side according to an embodiment of the present disclosure. The database 10 may be populated by one or more hierarchical objects. On the qualification side, each person, for example, an employee or other source of human capital, may be represented by a person object 11. The person object 11 may have one or more associated qualification objects 13. A qualification object 13 may represent a specific productive feature, for example, skills, for that person, for example, the ability to write computer programs. Each qualification object 13 may include attributes 14 and/or associated proficiencies 15. An attribute 14 may be a qualitative skill, such as fluency with C++. A proficiency 15 may be a quantitative assessment associated with a given attribute. For example, a number on the scale of 1 to 10 or a simple yes/no scale. For example, a given person object "John Smith" may have an associated qualification object comprising the attribute object "fluency with C++" and a proficiency object of "7". A proficiency may be a customization of an otherwise predefined grouping. For example, two people may share a qualification but have a different proficiency.

As discussed above, when populating the person object 11 with qualification objects 13, it may be convenient to use one or more qualification groups. Each qualification group may represent one or more qualification objects 13. Qualification groups may be used to facilitate data entry, organization and accuracy in programming the person objects 11. Qualification groups may be used to facilitate expression of sets of qualifications that commonly accompany one another. For example, there may be a "software design" qualification group that includes a set of attributes that are commonly associated with one who is capable of designing software.

Similarly, on the requirements side, each position may be represented by a position object 12. The position object 12 may have one or more associated requirement objects 16. Each requirement object 16 may represent a particular set of productive features, for example, skills, that are believed to be important for effectively filling the position. Each requirement object 16 may include attributes 14 and/or associated proficiencies 15.

A position object 12 may also have one or more associated task objects 17. Each task object 17 may include one or more requirement objects 16 that may together define a certain sort of responsibility that someone in the given position would have to fulfill. For example, a "software design manager" position object may include task objects such as "personnel management" and "software design." Each task object may then include one or more attributes and/or proficiencies. For example, the "personnel management" task may include a "leadership" attribute with an associated proficiency of 8 and an "organization" attribute with an associated proficiency of 7.

A job object is a generic definition of a position. One or more jobs may be used to more easily define a position object by potentially reducing the number of qualifications and tasks need not be explicitly applied to the position. To accomplish this, each job object may have one or more qualifications and/or tasks associated with it. When applied to a position object, the position object inherits the objects associated with the job objects.

In matching people to positions, a process called requirements analyzing may be executed. In requirements analyzing, the attributes and proficiencies of the various people are compared to the attributes and proficiencies of the various positions. For example, a "software engineer" position object with an associated requirement object with an associated attribute object "fluency with C++" and an associated proficiency object of "7" "may be matched to a person object with an associated attribute object "fluency with C++" and an associated proficiency object of "7."

Dynamic Qualifications Blocks

Embodiments of the present disclosure may utilize dynamic qualifications blocks to facilitate the population person objects and/or to enhance the effectiveness of the ERP. A dynamic qualification block is a basket of qualification objects, for example, including attributes and/or associated proficiencies.

Qualification groups, as described above, may be used to define a qualification catalogue. The qualification catalogue may be used to define the composition of objects such as qualifications. Qualification groups may be used independent of objects, e.g., qualification groups may not be associated directly to an object.

Dynamic qualification blocks 18 differ from qualification groups in that qualification blocks can be assigned directly to objects, for example, position objects, job objects and/or task objects. Qualification blocks do not define qualifications as qualification groups do.

Figure 2:
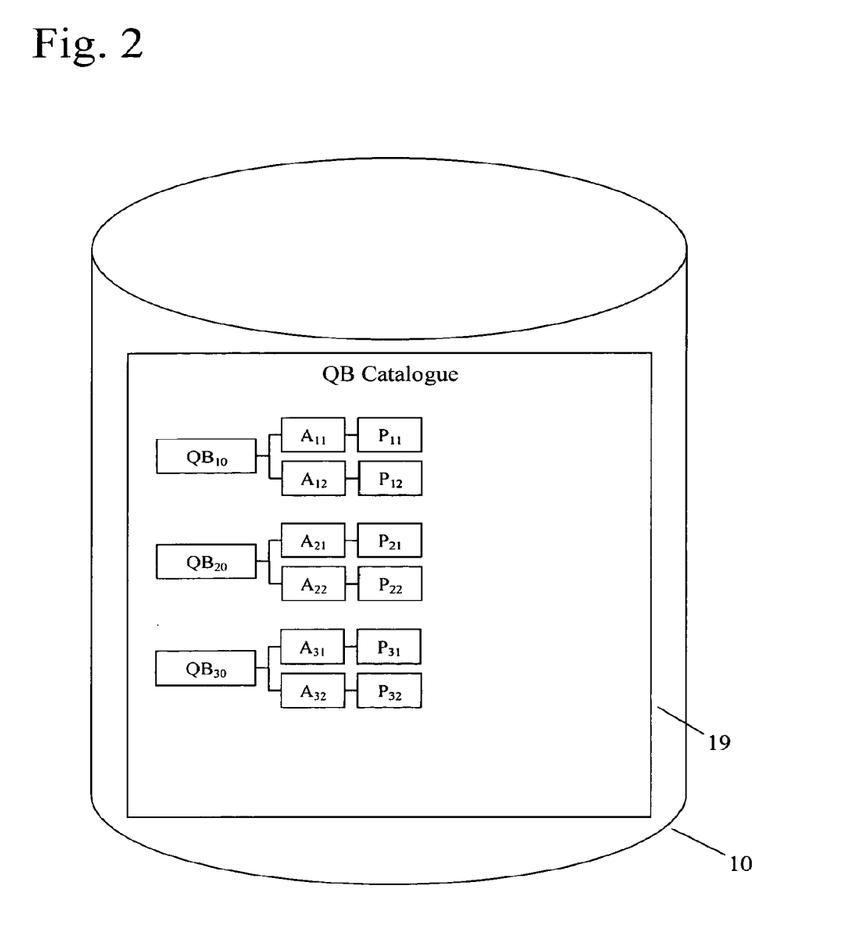
FIG. 2 shows the qualification block catalogue of FIG. 1 according to an embodiment of the present disclosure.

Qualification blocks may be assigned, for example on the requirements side, to positions, tasks and jobs. While dynamic qualification blocks may be assigned to an object, they need not be stored directly to the database in association with the person object. Definitions for dynamic qualification blocks may be stored in a qualification block catalogue that may be stored in the database. FIG. 2 shows the qualification block catalogue of FIG. 1 according to an embodiment of the present disclosure. When a dynamic qualification block 18 is associated with an object, for example a person object, only the qualification objects that are presently associated with the dynamic qualification block are stored to the database 20 in association with the person object. Therefore, if dynamic qualification blocks 18 are modified or deleted, the qualifications associated with each person object remain accurate without additional maintenance procedures.

The qualification block catalogue 19 may contain definitions of a plurality of qualification blocks (QB), for example, $QB_{10}$, $QB_{20}$ and $QB_{30}$. The definitions may indicate, for example, which attributes and qualifications are associated with each qualification block. For example, $QB_{10}$ may be defined as containing attribute $A_{11}$, proficiency $P_{11}$, attribute $A_{12}$ and proficiency $P_{12}$. $QB_{20}$ may be defined as containing attribute $A_{21}$, proficiency $P_{21}$, attribute $A_{22}$ and proficiency $P_{22}$. The other qualification blocks, for example, $QB_{20}$ and $QB_{30}$, may be similarly defined.

When a person object is displayed, the qualifications associated with that person may be analyzed according to the then existing dynamic qualification blocks and where appropriate, dynamic qualification blocks may be displayed in place of their constituent qualifications.

Embodiments of the present disclosure may also allow for partial qualification block fulfillment whereby when a person has some but not all qualifications necessary to make up a qualification block, that qualification block may be displayed or otherwise used along with an indication that the qualification block is partial. For example, a percentage indicating the degree to which the qualification block has been filled may be displayed.

Each qualification associated with the qualification blocks may have its own independent proficiencies. It is not required that proficiencies be applied to all qualifications associated with a qualifications block.

Requirements Analyzing

Requirements analyzing is the process of matching the requirements of a position with the qualifications of a person. Requirements analyzing traditionally utilizes a ridged approach where the hierarchy of the position object is rigidly compared to the hierarchy of the person object. As discussed above, the position object may have one or more associated tasks and each task may have one or more associated qualifications. Each qualification may then have an associated proficiency. Similarly, the person object may have one or more associated qualification groups or blocks, each with one or more associated qualifications. Each qualification may then have an associated proficiency.

Because the hierarchy of the position and the hierarchy of the person are rigidly compared in this hierarchical evaluation path, position tasks in their entirety are compared against person qualification blocks or groups in their entirety and unless the person has a group or block that exactly matches a task, a match is not made. Therefore, the traditional system suffers from the disadvantage that a person possessing all of the requisite qualifications to satisfy a particular position may not match to that position because the person's qualifications may be arranged in groups or blocks that do not exactly correspond to the tasks of the position.

Moreover, in the traditional system, proficiency levels are ignored as only the qualification groups or blocks are considered. Also, the traditional system relies on the hierarchies of position objects being commonly arranged as position objects having associated task objects having associated qualification objects. If a task object of a position object had one or more associated task objects each with associated qualification objects, then that position object could not be effectively matched using the hierarchical evaluation path.

Figure 3:
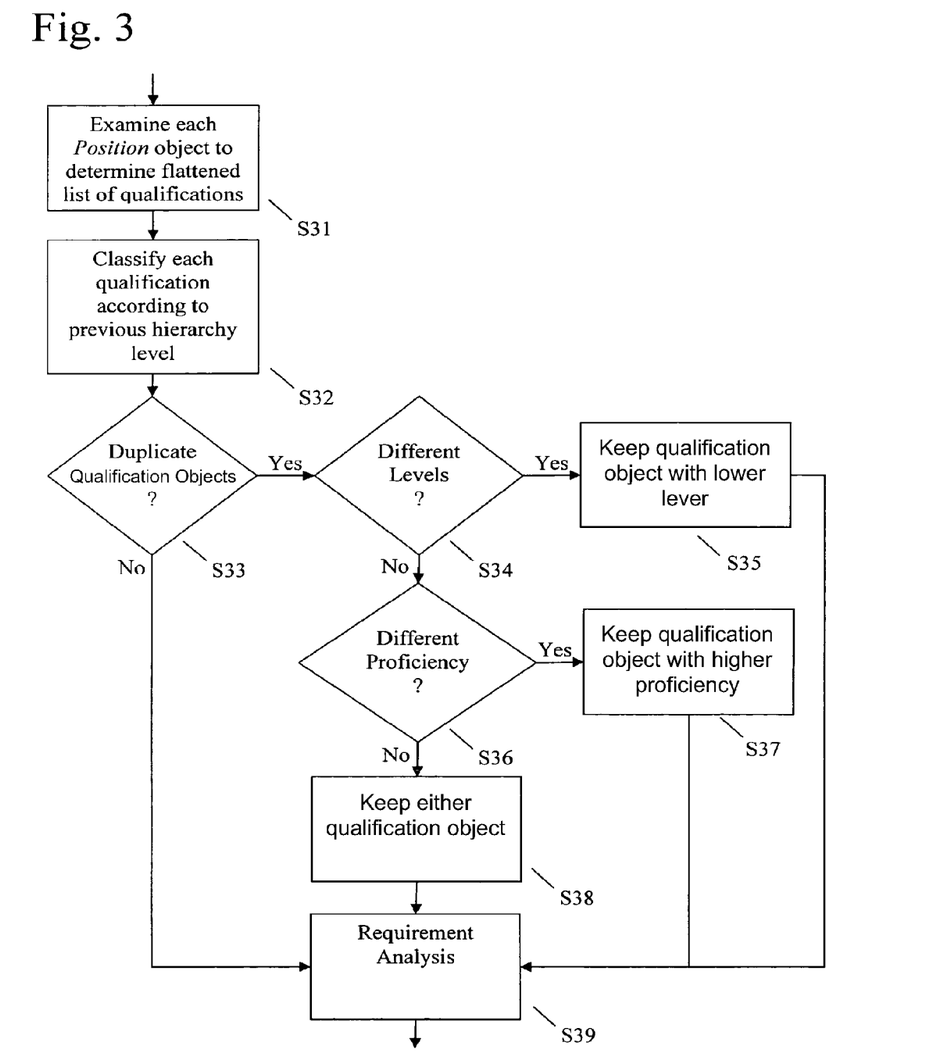
FIG. 3 is a flow chart showing a method for performing requirement analysis according to an embodiment of the present disclosure.

In embodiments of the present disclosure, a flexible and customizable evaluation path is used. FIG. 3 is a flow chart showing a method for performing requirement analysis according to an embodiment of the present disclosure. Each position object is examined to determine a flat list of all qualifications regardless of where they appear in the hierarchy (Step S31). The requirements may then be classified by their relative hierarchy level from the root object (Step S32). For example, if a qualification is directly associated with a position then it is given a classification of "1." Whereas, if a qualification is within a task which is within a task which is within the position, then the qualification is given a classification of "3." Under this approach, the lower the classification number, the closer the qualification is to the root.

In analyzing the position object, certain qualifications may appear more than once (Step S33). In these cases (Yes, Step S33), it may be determined whether the similar qualification objects have different classification numbers (Step S34). If they do (Yes, Step S34) then the qualification with the lesser classification number remains and the others are not considered (Step S35) then the requirement analysis may continue using the flattened list of qualifications (Step S39). If there are no duplicate qualification objects (No, Step S33) then the requirement analysis may continue using the flattened list of qualifications (Step S39).

However, if there are duplicate qualification objects (Yes, Step S33) and the levels are not different (No, Step S34) then it may be determined whether there is a difference in the proficiency levels associated with the duplicate qualification objects (Step S36). If there are differences in the proficiency levels associated with the duplicate qualification objects (Yes, Step S36) then the qualification object with the highest proficiency is kept and the rest are discarded (Step S37) then the requirement analysis may continue using the flattened list of qualifications (Step S39). However, if there are no differences in the proficiency levels (No, Step S36) then the qualification objects are functionally identical and one may be kept and the others discarded (Step S38) then the requirement analysis may continue using the flattened list of qualifications (Step S39).

When performing requirements analyzing, the qualifications of the position may be compared directly to the qualifications of the person. Qualifications will not fail to match simply because the hierarchies may differ. The classification numbers and the proficiency values of the qualifications may then factor into determining the relative strength of a match between person and position according to a predetermined weight.

Where no single person object contains qualifications matches for all of the qualifications associated with the position object, a most-capable person object may be determined, for example, by comparing sub-groupings such as qualifications blocks and/or tasks.

Embodiments of the present disclosure also allow for greater freedom in defining the position object. For example, a position object may have associated tasks which may themselves have associated tasks. It may also be possible for a task to have an associated position.

Figure 4:
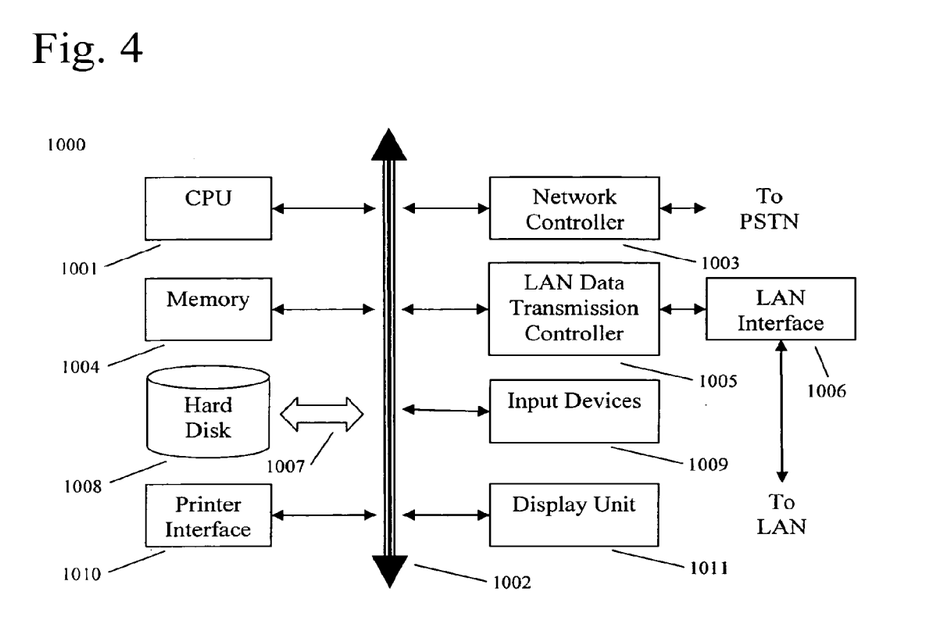
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A computer-implemented method for matching a first object having a set of qualifications to a second object, comprising:

providing, via a computer, in a database storage, the second object having at least one of a task having requirements and a requirement, each requirement further having a plurality of qualification attributes of the each requirement and each qualification attribute being associated with a proficiency value defining a requirement level for the each qualification attribute, wherein the second object, the task, the requirements, the plurality of qualification attributes and their associated proficiency values form a hierarchical data structure having the second object as a root;

labeling, by the computer, each qualification attribute with a classification number indicating a number of relative hierarchy levels of the each qualification attribute from the root;

flattening, by the computer, the hierarchical data structure of the second object into a flattened list of qualification attributes each with a corresponding classification number;

determining, by the computer, whether or not the second object has duplicate qualification attributes in the flattened list;

performing, by the computer, requirements analyzing of the first object against the flattened list based on the corresponding classification number of the each qualification attribute and the determination of whether or not the second object has duplicate qualification attributes; and matching, by the computer, the first object to the second object based on the requirements analyzing.

2. The method of claim 1, wherein the first object having the set of qualifications is a person object representing a person and the second object having the set of requirements is a position object representing a position.

3. The method of claim 1, further comprising:
providing definitions of predetermined blocks for the first object and the second object, the blocks including a plurality of qualification attributes and/or proficiencies;
storing the definitions of predetermined blocks in catalog within in a database;
matching at least one of the plurality of qualification attributes and proficiencies of the second object block to those of the first object;
determining whether one or more of the predetermined blocks are wholly or partially fulfilled by a set of at least one of qualification attributes and proficiencies of the first object; and
displaying any predetermined blocks of qualifications that have been determined to be partially fulfilled, along with a percentage indicating a degree to which the blocks have been fulfilled.

4. The method of claim 1, wherein the performing requirements analyzing further includes, for duplicate qualification attributes in the flattened list,
determining whether the duplicate qualification attributes have the same classification numbers;
if the duplicate qualification attributes do not have the same qualification numbers, only the qualification attribute with the lesser classification number remains in the flattened list for performing the requirements analyzing, and the rest are discarded;
otherwise, if the duplicate qualification attributes do have the same classification numbers, determining whether a proficiency difference exists among the duplicate qualification attributes;
if a proficiency difference exists, only the qualification attribute of the highest proficiency remains in the flattened list for performing the requirements analyzing, and the rest are discarded;
otherwise, if proficiency difference does not exist, the qualification attributes are identical and one qualification attribute is kept in the flattened list while the other is discarded.

5. A computer implemented method for matching a person represented by a person object within a database to a position represented by a position object within the database, comprising:
reading, by a computer, a set of qualifications applied to the person object from the database;
storing, by the computer, in the database, the position object having at least one of a task having requirements and a requirement, each requirement further having a plurality of qualification attributes of the each requirement and each qualification attribute being associated with a proficiency value defining a requirement level for the each qualification attribute, wherein the position object, the task, the requirements, the plurality of qualification attributes and their associated proficiency values form a hierarchical data structure having the position object as a root;
labeling, by the computer, each qualification attribute of the position object with a classification number indicating a number of relative hierarchy levels of the each qualification attribute from depth value with respect to the root;
flattening, by the computer, the hierarchical data structure of the position object into a flattened list of qualification attributes each with a corresponding classification number;
determining, by the computer, whether or not the position object has duplicate qualification attributes in the flattened list; and
matching, by the computer, the person object to the position object by performing requirements analyzing, which compares the person object against the flattened list based on the corresponding classification number of the each qualification attribute and the determination of whether or not the second object has duplicate qualification attributes.

6. The method of claim 5, wherein the performing requirements analyzing further includes, for duplicate qualification attributes in the flattened list,
determining whether the duplicate qualification attributes have the same classification numbers;
if the duplicate qualification attributes do not have the same qualification numbers, only the qualification attribute with the lesser classification number remains in the flattened list for performing the requirements analyzing, and the rest are discarded;
otherwise, if the duplicate qualification attributes do have the same classification numbers, determining whether a proficiency difference exists among the duplicate qualification attributes;
if a proficiency difference exists, only the qualification attribute of the highest proficiency remains in the flattened list for performing the requirements analyzing, and the rest are discarded;
otherwise, if proficiency difference does not exist, the qualification attributes are identical and one qualification attribute is kept in the flattened list while the other is discarded.

7. A computer recording medium comprising computer executable code stored thereon, which when executed causes a computer to perform a method of matching a first object having a set of qualifications to a second object having a set of requirements, comprising:
code for providing the second object having at least one of a task having requirements and a requirement, each requirement further having a plurality of qualification attributes of the each requirement and each qualification attribute being associated with a proficiency value defining a requirement level for the each qualification attribute, wherein the second object, the task, the requirements, the plurality of qualification attributes and their associated proficiency values form a hierarchical data structure having the second object as a root;

code for labeling each qualification attribute with a classification number indicating a number of relative hierarchy levels of the each qualification attribute from the root;

code for flattening the hierarchical data structure of the second object into a flattened list of qualification attributes each with a corresponding classification number;

code for determining whether or not the second object has duplicate qualification attributes in the flattened list;

code for performing requirements analyzing of the first object against the flattened list based on the corresponding classification number of the each qualification attribute and the determination of whether or not the second object has duplicate qualification attributes; and code for matching the first object to the second object based on the requirements analyzing.

8. The computer recording medium of claim 7, wherein the first object having the set of qualifications is a person object representing a person and the second object having the set of requirements is a position object representing a position.

9. The computer recording medium of claim 7, further comprising:

code providing definitions of predetermined blocks for the first object and the second object, the blocks including a plurality of qualification attributes and/or proficiencies;

code for storing the definitions of predetermined blocks in catalog within in a database;

code for matching at least one of the plurality of qualification attributes and proficiencies of the second object block to those of the first object;

code for determining whether one or more of the predetermined blocks are wholly or partially fulfilled by a set of at least one of qualification attributes and proficiencies of the first object; and code for displaying any predetermined blocks of qualifications that have been determined to be partially fulfilled, along with a percentage indicating a degree to which the blocks have been fulfilled.

10. The computer recording medium of claim 7, wherein the performing requirements analyzing further includes, for duplicate qualification attributes in the flattened list, determining whether the duplicate qualification attributes have the same classification numbers;

if the duplicate qualification attributes do not have the same qualification numbers, only the qualification attribute with the lesser classification number remains in the flattened list for performing the requirements analyzing, and the rest are discarded;

otherwise, if the duplicate qualification attributes do have the same classification numbers, determining whether a proficiency difference exists among the duplicate qualification attributes;

if a proficiency difference exists, only the qualification attribute of the highest proficiency remains in the flattened list for performing the requirements analyzing, and the rest are discarded;

otherwise, if proficiency difference does not exist, the qualification attributes are identical and one qualification attribute is kept in the flattened list while the other is discarded.

11. A computer recording medium comprising computer executable code stored thereon, which when executed causes a computer to perform a method of matching a person represented by a person object within a database to a position represented by a position object within the database, comprising:

code for reading a set of qualifications applied to the person object from the database;

code for storing in the database the position object having at least one of a task having requirements and a requirement, each requirement further having a plurality of qualification attributes of the each requirement and each qualification attribute being associated with a proficiency value defining a requirement level for the each qualification attribute, wherein the position object, the task, the requirements, the plurality of qualification attributes and their associated proficiency values form a hierarchical data structure having the position object as a root;

code for labeling each qualification attribute of the position object with a classification number indicating a number of relative hierarchy levels of the each qualification attribute from the root;

code for flattening the hierarchical data structure of the position object into a flattened list of qualification attributes each with a corresponding classification number;

code for determining whether or not the second object has duplicate qualification attributes in the flattened list; and code for matching the person object to the position object by performing requirements analyzing, which compares the person object against the flattened list based on the corresponding classification number of the each qualification attribute and the determination of whether or not the second object has duplicate qualification attributes.

12. The computer recording medium of claim 11, wherein the performing requirements analyzing further includes, for duplicate qualification attributes in the flattened list, determining whether the duplicate qualification attributes have the same classification numbers;

if the duplicate qualification attributes do not have the same qualification numbers, only the qualification attribute with the lesser classification number remains in the flattened list for performing the requirements analyzing, and the rest are discarded;

otherwise, if the duplicate qualification attributes do have the same classification numbers, determining whether a proficiency difference exists among the duplicate qualification attributes;

if a proficiency difference exists, only the qualification attribute of the highest proficiency remains in the flattened list for performing the requirements analyzing, and the rest are discarded;

otherwise, if proficiency difference does not exist, the qualification attributes are identical and one qualification attribute is kept in the flattened list while the other is discarded.

13. A computer system comprising: a processor; and a program storage device including computer executable code, tangibly embodied on a computer recording medium readable by the computer system, for matching a first object having a set of qualifications to second object having a set of requirements, the computer executable code comprising:

code for providing the second object having at least one of a task having requirements and a requirement, each requirement further having a plurality of qualification attributes of the each requirement and each qualification attribute being associated with a proficiency value defining a requirement level for the each qualification attribute, wherein the second object, the task, the requirements, the plurality of qualification attributes and their associated proficiency values form a hierarchical data structure having the second object as a root;

code for labeling each qualification attribute with a classification number indicating a number of relative hierarchy levels of the each qualification attribute from the root;

code for flattening the hierarchical data structure of the second object into a flattened list of qualification attributes each with a corresponding classification number;

code for determining whether or not the second object has duplicate qualification attributes in the flattened list; and code for performing requirements analyzing of the first object against the flattened list based on the corresponding classification number of the each qualification attribute and the determination of whether or not the second object has duplicate qualification attributes; and code for matching the first object to the second object based on the requirements analyzing.

14. The computer system of claim 13, wherein the first object having the set of qualifications is a person object representing a person and the second object having the set of requirements is a position object representing a position.

15. The computer system of claim 13, further comprising:
code providing definitions of predetermined blocks for the first object and the second object, the blocks including a plurality of qualification attributes and/or proficiencies;
code for storing the definitions of predetermined blocks in catalog within in a database;
code for matching at least one of the plurality of qualification attributes and proficiencies of the second object block to those of the first object;
code for determining whether one or more of the predetermined blocks are wholly or partially fulfilled by a set of at least one of qualification attributes and proficiencies of the first object; and
code for displaying any predetermined blocks of qualifications that have been determined to be partially fulfilled, along with a percentage indicating a degree to which the blocks have been fulfilled.

16. The system of claim 13, wherein the performing requirements analyzing further includes, for duplicate qualification attributes in the flattened list,
determining whether the duplicate qualification attributes have the same classification numbers;
if the duplicate qualification attributes do not have the same qualification numbers, only the qualification attribute with the lesser classification number remains in the flattened list for performing the requirements analyzing, and the rest are discarded;
otherwise, if the duplicate qualification attributes do have the same classification numbers, determining whether a proficiency difference exists among the duplicate qualification attributes;
if a proficiency difference exists, only the qualification attribute of the highest proficiency remains in the flattened list for performing the requirements analyzing, and the rest are discarded;

otherwise, if proficiency difference does not exist, the qualification attributes are identical and one qualification attribute is kept in the flattened list while the other is discarded.

17. A computer system comprising: a processor; and a program storage device including computer executable code, tangibly embodied on a computer recording medium readable by the computer system, for matching a person represented by a person object within a database to a position represented by a position object within the database, the computer executable code comprising:

code for reading a set of qualifications applied to the person object from the database;

code for storing in the database the position object having at least one of a task having requirements and a requirement, each requirement further having a plurality of qualification attributes of the each requirement and each qualification attribute being associated with a proficiency value defining a requirement level for the each qualification attribute, wherein the position object, the task, the requirements, the plurality of qualification attributes and their associated proficiency values form a hierarchical data structure having the position object as a root;

code for labeling each qualification attribute of the position object with a classification number indicating a number of relative hierarchy levels of the each qualification attribute from the root;

code for flattening the hierarchical data structure of the position object into a flattened list of qualification attributes each with a corresponding classification number;

code for determining whether or not the second object has duplicate qualification attributes in the flattened list; and code for matching the person object to the position object by performing requirements analyzing, which compares the person object against the flattened list based on the corresponding classification number of the each qualification attribute and the determination of whether or not the second object has duplicate qualification attributes.

18. The system of claim 17, wherein the performing requirements analyzing further includes, for duplicate qualification attributes in the flattened list,
determining whether the duplicate qualification attributes have the same classification numbers;
if the duplicate qualification attributes do not have the same qualification numbers, only the qualification attribute with the lesser classification number remains in the flattened list for performing the requirements analyzing, and the rest are discarded;
otherwise, if the duplicate qualification attributes do have the same classification numbers, determining whether a proficiency difference exists among the duplicate qualification attributes;
if a proficiency difference exists, only the qualification attribute of the highest proficiency remains in the flattened list for performing the requirements analyzing, and the rest are discarded;
otherwise, if proficiency difference does not exist, the qualification attributes are identical and one qualification attribute is kept in the flattened list while the other is discarded.

* * * * *